(12) United States Patent
Loef et al.

(10) Patent No.: US 9,301,354 B2
(45) Date of Patent: Mar. 29, 2016

(54) INTERFACE CIRCUIT FOR A LIGHT SOURCE

(75) Inventors: Christoph Loef, Aachen (DE); Haimin Tao, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 172 days.

(21) Appl. No.: 14/008,580

(22) PCT Filed: Mar. 27, 2012

(86) PCT No.: PCT/IB2012/051446
§ 371 (c)(1),
(2), (4) Date: Sep. 30, 2013

(87) PCT Pub. No.: WO2012/131573
PCT Pub. Date: Oct. 4, 2012

(65) Prior Publication Data
US 2014/0021871 A1    Jan. 23, 2014

(30) Foreign Application Priority Data
Mar. 30, 2011    (EP) ..................................... 11160370

(51) Int. Cl.
*H05B 33/08*    (2006.01)

(52) U.S. Cl.
CPC ........ *H05B 33/0818* (2013.01); *H05B 33/0809* (2013.01); *H05B 33/0824* (2013.01); *H05B 33/0896* (2013.01)

(58) Field of Classification Search
CPC ........... H05B 33/0818; H05B 33/0896; H05B 33/0824; H05B 33/0809
See application file for complete search history.

(56) References Cited

U.S. PATENT DOCUMENTS

| 8,581,498 B1* | 11/2013 | Cheung et al. ................ 315/121 |
| 2006/0193131 A1 | 8/2006 | McGrath et al. |
| 2008/0197786 A1 | 8/2008 | Schaible et al. |
| 2009/0200955 A1 | 8/2009 | Maros et al. |
| 2010/0033095 A1 | 2/2010 | Sadwick |

(Continued)

FOREIGN PATENT DOCUMENTS

| DE | 102010003266 A1 | 9/2011 |
| EP | 2178345 A2 | 4/2010 |
| WO | 2007035203 A2 | 3/2007 |

OTHER PUBLICATIONS

Tom Ribarich; "How to Design a Dimming Fluorescent Electronic Ballast", EE Times, Connecting the Global Electronics Community, 2006, pp. 1-7.

(Continued)

*Primary Examiner* — Jung Kim

(57) ABSTRACT

An interface circuit is disclosed for operating a light source from an electronic fluorescent driver. In one example, the interface circuit comprises
input terminals for connection to lamp connection terminals of the electronic fluorescent lamp driver,
a first string interconnecting a first pair of input terminals,
a second string interconnecting a second pair of input terminals,
a third string interconnecting a first terminal of the first string and a second terminal of the second string and comprising a rectifier, output terminals of said rectifier being coupled during operation to the light source.
When a light source is operated making use of the interface circuit, a proper emulation of a fluorescent lamp is obtained.

15 Claims, 3 Drawing Sheets

(56) References Cited

U.S. PATENT DOCUMENTS

2010/0052556 A1 3/2010 Zudrell-Koch et al.
2010/0194296 A1 8/2010 Park
2011/0043127 A1 2/2011 Yamasaki
2011/0043136 A1 2/2011 Radermacher
2011/0057572 A1 3/2011 Kit et al.
2012/0104970 A1* 5/2012 Okubo et al. ............ 315/291

OTHER PUBLICATIONS

"Small Ballast Control IC for Fluorescent Lamp Ballats", Infineon, Application Note, V1.0, Jun. 2007, pp. 1-37.

* cited by examiner

INTERFACE CIRCUIT FOR A LIGHT SOURCE

FIELD OF INVENTION

The invention relates to an interface circuit for operating a light source by making use of a high frequency fluorescent lamp driver, and a corresponding method of operating a light source by making use of a high frequency fluorescent lamp driver.

BACKGROUND OF THE INVENTION

An interface circuit as mentioned in the opening paragraph is described in US2010/0033095 A1.

Fluorescent lamps are highly efficient light sources that have been in use for many years. The efficiency and lifetime of fluorescent lamps are particularly high when they are driven by an electronic lamp driver that supplies a high frequency lamp current with a frequency in the order of 10 kHz. As a consequence, luminaires comprising such a high frequency fluorescent lamp driver are present in homes and offices all over the world. However, in recent years alternative electrically powered light sources in the form of LEDs and OLEDs or high pressure discharge lamps have become available that have an efficiency and a lifetime that is even higher than that of a fluorescent lamp. Consequently, it is desirable to replace the fluorescent lamp in the existing luminaires by a light source based on LEDs or OLEDs or by a high pressure discharge lamp in order to increase the efficiency and/or the lifetime of the light source in use. Since LEDs and OLEDs need to be operated with a DC-current instead of a high frequency AC-current, it is not possible to simply replace the fluorescent lamp by a LED array. Also in the case of a high pressure discharge lamp it is preferred to supply the light source with a DC-current, possibly commutated at a low frequency. It is thus necessary to make use of an interface circuit connected between the lamp terminals of the high frequency fluorescent lamp driver and the light source that replaces the fluorescent lamp. The interface circuit and the light source together must emulate a fluorescent lamp, when the interface circuit and the light source are jointly connected to the lamp connection terminals and the high frequency fluorescent lamp driver goes through the lamp operating stages: preheat, ignition and stationary operation. Furthermore, the interface circuit must convert the high frequency AC voltage supplied by the high frequency lamp driver into a DC-current that supplies the light source.

SUMMARY OF THE INVENTION

The invention aims to provide an interface circuit and a corresponding method that is capable of emulating a fluorescent lamp in a simple and effective way.

According to an aspect of the present invention, an interface circuit for operating a light source is provided, equipped with input terminals for connection to lamp connection terminals of an electronic fluorescent lamp driver,
a first string interconnecting a first pair of input terminals,
a second string interconnecting a second pair of input terminals,
a third string interconnecting a first terminal of the first string and a second terminal of the second string and comprising a rectifier, output terminals of said rectifier being coupled, during operation, to the light source, and a first switching element for controlling the conductive state of the third string,
a fourth string coupled to the third string and comprising a sensor circuit, having an output terminal coupled to a control electrode of the first switching element, for sensing the amplitude of a high frequency AC voltage between the first and the second terminal and for rendering the first switching element conductive when the amplitude of the high frequency AC voltage reaches a predetermined value.

In the case that a fluorescent lamp is connected to a high frequency fluorescent lamp driver, the high frequency fluorescent lamp driver generates a high frequency voltage with a comparatively high amplitude across the fluorescent lamp during the ignition phase. When the fluorescent lamp ignites, the voltage across the lamp decreases strongly and the lamp carries a current. In reaction to the ignition (detected by the voltage drop or the presence of a lamp current), the high frequency fluorescent lamp driver changes its operation state from ignition to stationary operation by changing its frequency of operation and supplies a high frequency AC current to the lamp. In the case of an interface circuit according to the invention being connected to the high frequency fluorescent lamp driver, the sensor circuit detects the ignition voltage that has an amplitude higher than the predetermined value and renders the first switching element comprised in the third string conductive. The first switching element controls the conductive state of the third string. As a consequence, the voltage between the first and second terminal drops and the light source starts carrying current. The high frequency fluorescent lamp driver is thereby triggered to change its operating state from ignition to stationary operation and supplies a high frequency current to the third string, that is rectified by the rectifier and subsequently supplied to the light source. Thus, the ignition of the lamp is emulated in a simple and effective manner.

In a first preferred embodiment of an interface circuit according to the invention, the interface circuit comprises a DC-DC-converter coupled, during operation, between output terminals of the rectifier and the light source. The DC-DC-converter can for instance be an up-converter, a down converter or a fly-back converter. Such converters are well known in the art and need not be further discussed. The DC-DC-converter converts the voltage across the third string, that approximately equals the voltage across a burning fluorescent lamp, into a voltage that matches the voltage across the light source when it carries current. As a consequence, the light source need not be constructed such that, in operation, the voltage across it exactly matches the voltage across a burning fluorescent lamp. It is remarked that in the case that the light source is a high pressure discharge lamp, it may be necessary to provide a commutator such as a full bridge between the DC-DC-converter and the light source to commutate the DC-current supplied by the DC-DC-converter. Furthermore, to ignite the lamp, the interface circuit needs to be equipped with, for instance, a separate igniter. Full bridge commutator circuits and igniter circuits are well known in the art and need not be further discussed.

In a further preferred embodiment of the interface circuit according to the invention, the interface circuit comprises a capacitor that, during operation, shunts the light source. By virtue of the capacitor, the amplitude of the current through the light source changes less during a period of the high frequency current generated by the high frequency fluorescent lamp driver, so that the same is true for the light output of the light source.

In the case that the amount of power consumed by the light source is lower than the amount of power consumed by the fluorescent lamp that the high frequency fluorescent lamp driver is designed for, it may be desirable that the interface circuit according to the invention is equipped with a fifth string connected in parallel to the third string and comprising an impedance and a further switching element having its control electrode coupled to an output terminal of the sensor circuit. Alternatively, the interface circuit may be equipped with a fifth string comprising an impedance and a further switching element and being coupled between output terminals of the rectifier comprised in the third string. Also in this case, a control electrode of the further switching element is coupled to an output terminal of the sensor circuit. Depending on the position of the first switching element in the third string, as a third possibility, the interface circuit may be equipped with a fifth string coupled between input terminals of the rectifier comprised in the first string and comprising an impedance.

In all three cases, the impedance will carry current during operation of the light source. Since the high frequency fluorescent lamp driver acts as a current source, the impedance lowers the current through the light source and thereby also the amount of power consumed by the light source. A proper choice of the impedance value thus enables a proper match to be achieved between the power that the LED-array is designed to consume and the power that the high frequency fluorescent lamp driver is designed to supply. Instabilities are thereby avoided. The impedance may be a resistor. However, a reactive element, more in particular a capacitor, is preferred to minimize power dissipation.

According to another aspect of the invention, a method of operating a light source making use of an electronic fluorescent lamp driver is provided, comprising the steps of providing a first string coupled between a first pair of lamp connection terminals of the electronic fluorescent lamp driver, providing a second string coupled between a second pair of lamp connection terminals of the fluorescent lamp driver, providing a third string coupled between a first terminal of the first and a second terminal of the second string and comprising a rectifier, output terminals of said rectifier being coupled, during operation, to the light source, and a first switching element for controlling the conductive state of the third string, sensing a high frequency voltage between the first and the second string and rendering the first switching element conductive when the amplitude of the high frequency AC voltage reaches a predetermined value.

Preferably, the method further comprises the steps of providing a fifth string connected in parallel to the third string and comprising an impedance and a further switching element having its control electrode coupled to an output terminal of the sensor circuit, and rendering the further switching element conductive, when the sensed amplitude of the high frequency AC voltage reaches the predetermined value. The advantage of these two steps corresponds to the advantage explained hereinabove for the corresponding feature in the interface circuit.

The light source is preferably one of the group formed by LED, OLED and high pressure discharge lamp.

BRIEF DESCRIPTION OF THE DRAWINGS

Embodiments of an interface circuit according to the invention will now be discussed, making use of a drawing.

In the drawing.

DETAILED DESCRIPTION OF PREFERRED EMBODIMENTS

Figure 1:
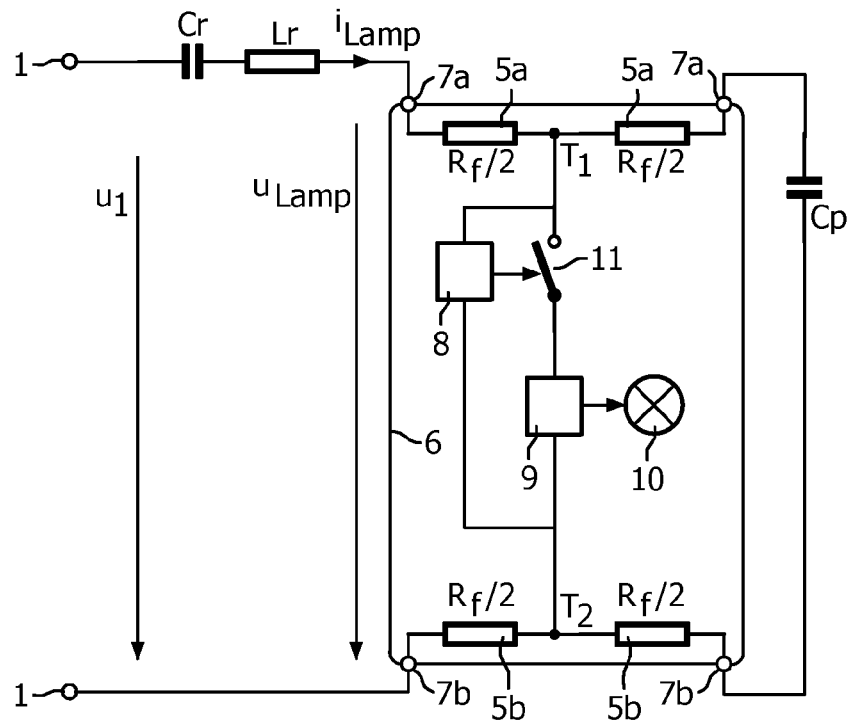
FIGS. 1-6 show embodiments of an interface circuit according to the invention with a light source connected thereto.

In FIG. 1, the terminals 1 are terminals comprised in a high frequency fluorescent lamp driver. Cr and Lr are a DC-blocking capacitor and a resonant choke, respectively, that are part of the high frequency fluorescent lamp driver. Reference numerals 7a and 7b are a first pair of input terminals and a second pair of input terminals, respectively, of the interface circuit, that are connected to lamp connection terminals of the high frequency fluorescent lamp driver. Reference numeral 5a is a first string interconnecting the first pair of input terminals 7a. Reference numeral 5b is a second string interconnecting the second pair of input terminals. Both strings comprise a series arrangement of two resistors, each having a resistance equal to half the resistance (Rf/2) of a filament of a fluorescent lamp. It is remarked that the presence of the resistors in the first and second string is not absolutely necessary. Capacitor Cp connects an input terminal of the first pair to an input terminal of the second pair. Capacitor Cp is also part of the high frequency fluorescent lamp driver.

A common terminal of the resistors comprised in the first string forms a first terminal T1 of the first string and a common terminal of the resistors comprised in the second string forms a second terminal T2. The first and the second terminal are interconnected by a third string comprising a first switching element 11 and a circuit part 9 that comprises a rectifier. Circuit part 9 is coupled to light source 10. Light source 10 may be an array of LEDs or OLEDs or a high pressure discharge lamp.

It is remarked that apart from the rectifier, circuit part 9 may comprise additional circuitry such as a DC-DC-converter that, during operation, is coupled between the rectifier and the light source 10.

The first terminal T1 and the second terminal T2 are also interconnected by means of a fourth string comprising a sensor circuit 8, having an output terminal coupled to a control electrode of the first switching element 11, for sensing the amplitude of the high frequency AC voltage between the first and second terminal and for rendering the first switching element conductive when the amplitude of the high frequency AC voltage reaches a predetermined value. Input terminals 7a and 7b, first string 5a, second string 5b, first switching element 11, circuit part 9 and sensor circuit 8 together form an interface circuit 6 for operating a light source.

The operation of the embodiment shown in FIG. 1 is as follows.

When the high frequency fluorescent lamp driver is switched on, the lamp driver enters a first operational state, normally referred to as "preheat", during which a preheat current is generated that flows through the filaments of a connected fluorescent lamp to preheat the electrodes. During this preheat state, the voltage across the lamp is maintained at a comparatively low value to prevent ignition of the lamp. Both the lamp voltage and the preheat current are determined by the operating frequency of the high frequency fluorescent lamp driver. In the case that not a fluorescent lamp but the interface circuit shown in FIG. 1 is connected to the lamp connection terminals, the preheat current flows through the first string, capacitor Cp and the second string. The first and second string thus emulate the filaments of a fluorescent lamp.

After a predetermined time lapse, a second operational state "ignition" is entered. During this operational state, the operating frequency is adjusted to a value such that an ignition voltage with a comparatively high amplitude is present across the lamp. In the case that the lamp ignites under the influence of this ignition voltage, the voltage across the lamp drops and the lamp starts carrying current. When this is detected by the control circuitry of the high frequency fluorescent lamp driver, a third operational stage "stationary operation" is entered. During this stage, the operating frequency is adjusted such that the lamp is supplied with a current that substantially equals the nominal lamp current. In the case that not a fluorescent lamp but the interface circuit shown in FIG. 1 is connected to the lamp connection terminals during "ignition", the detector circuit detects that the voltage across the lamp is higher than the predetermined value and renders the first switching element conductive. As a consequence, the voltage across the third string drops and the third string starts carrying current. This is detected by the control circuitry of the high frequency fluorescent lamp driver and the third operational stage "stationary operation" is entered. During this operational stage, a current substantially equal to the nominal lamp current flows through the third string. This current is rectified by the rectifier and supplied directly or via a DC-DC-converter to the light source.

In the embodiment shown in FIG. 2-FIG. 6, components and circuit parts that are similar to components and circuit parts of the embodiment shown in FIG. 1 have identical reference numbers.

Figure 2:
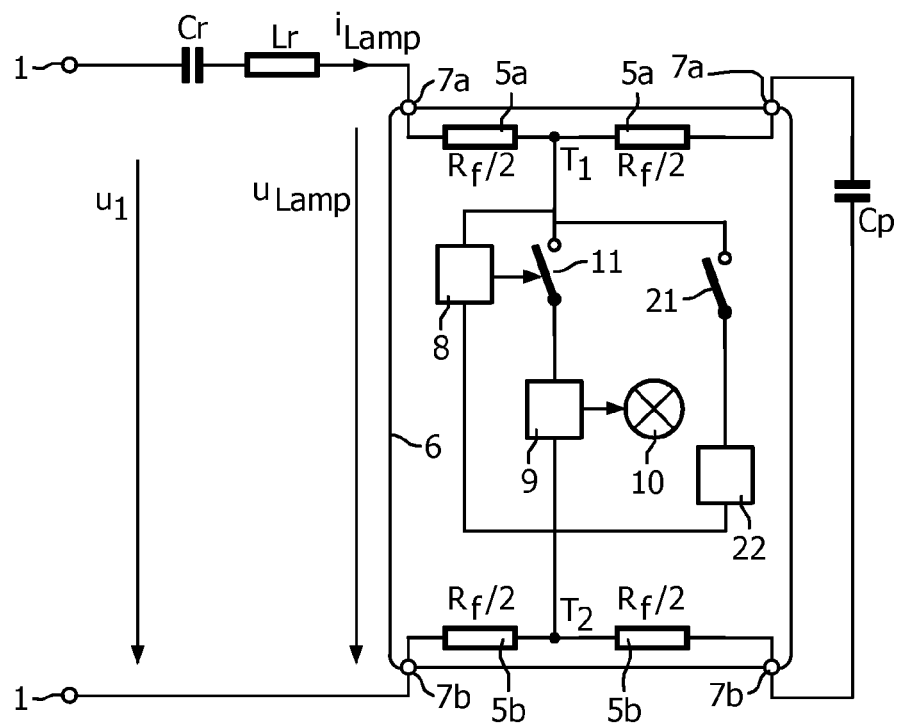

The only difference between the embodiment in FIG. 1 and the embodiment in FIG. 2 is that the latter comprises a fifth string connected in parallel with the third string and comprising an impedance 22 and a further switching element 21. During operation, the further switching element is rendered conductive at the same time as the first switching element, so that not only the third string but also the fifth string start carrying current. The impedance 22 is dimensioned such that the sum of the current through the third string and the current through the fifth string approximately equals the current through the fluorescent lamp that the high frequency fluorescent lamp driver is designed for. In this way, the interface circuit provides a good emulation of the fluorescent lamp also during stationary operation. As a consequence, the light source operation is stable.

Figure 3:
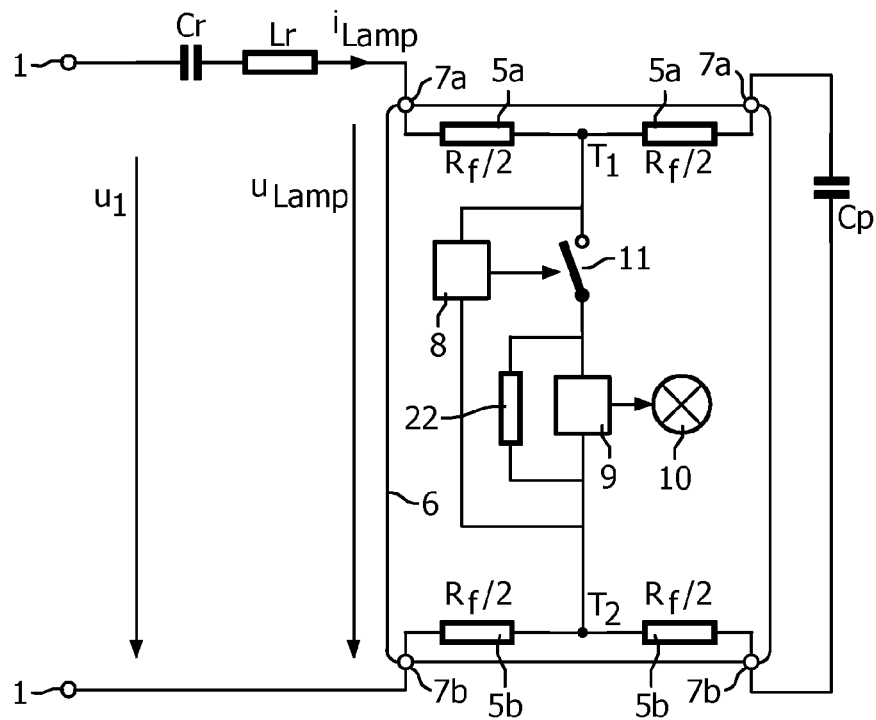

The embodiment shown in FIG. 3 also comprises a fifth string. The fifth string comprises an impedance 22 and is connected between input terminals of the rectifier. When the first switching element is rendered conductive, both the light source 10 and the impedance 22 carry current. Also in this embodiment, the impedance 22 is dimensioned such that the sum of the current through the third string and the current through the fifth string approximately equals the current through the fluorescent lamp that the high frequency fluorescent lamp driver is designed for. It is remarked that in the embodiment shown in FIG. 3, sensor circuit 8 can also be connected in parallel with the first switching element 11.

In the embodiments shown in FIG. 2 and FIG. 3, the impedance 22 carries an AC-current during operation. To minimize power dissipation, impedance 22 is preferably a capacitor.

It is remarked that the first switching element 11 in the embodiments shown in FIG. 1 to FIG. 3 is a bidirectional switch. The further switching element in the embodiment shown in FIG. 2 is also a bidirectional switch. The first and further switching elements comprised in the embodiments shown in FIG. 4 to FIG. 6 are unidirectional switching elements.

Figure 4:
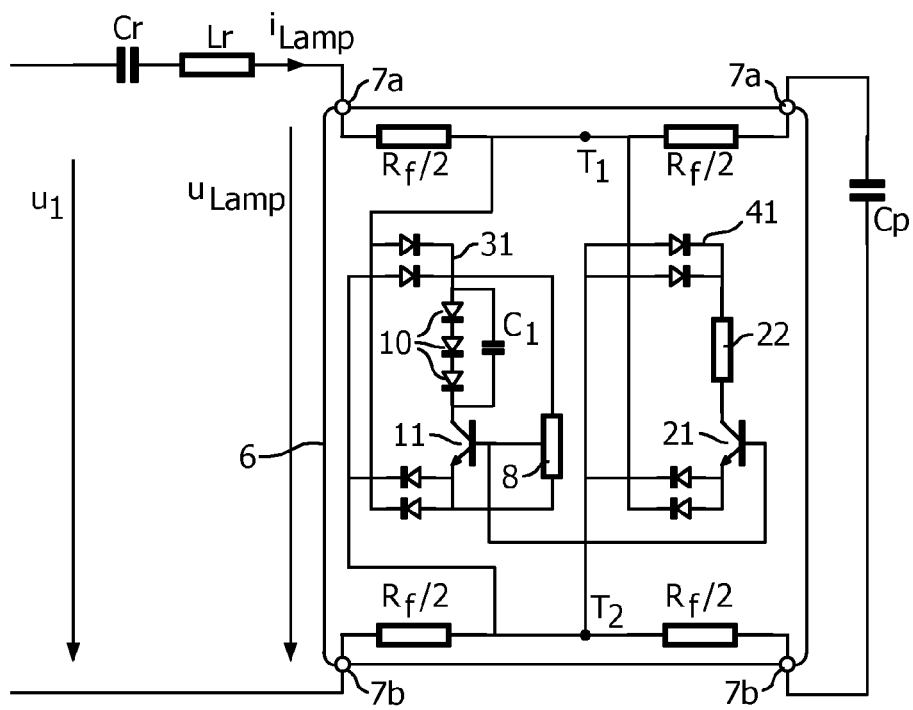

In the embodiment shown in FIG. 4, the third string and the fifth string are shown in slightly more detail than in FIG. 1, FIG. 2 and FIG. 3. Reference numeral 31 is a rectifier in the form of a diode bridge. A LED array 10 is shunted by a capacitor C1 and connected in series with a first switching element 11 between output terminals of the diode bridge 31. The output terminals of the diode bridge are also interconnected by means of a fourth string comprising a sensor circuit 8, of which an output is coupled to a control electrode of the first switching element 11. The fifth string comprises a rectifier 41 and a series arrangement of an impedance 22 and a further switching element 21, connected to output terminals of rectifier 41. A control electrode of further switching element 21 is connected to the output of sensor circuit 8. When sensor circuit 8 senses a voltage amplitude higher than the predetermined value, it renders the first switch 11 and the further switch 21 conductive. LED-array 10, impedance 22 and both switching elements 11 and 21 carry current. Impedance 22 is dimensioned such that the sum of the currents through the third and fifth string match the lamp current of the fluorescent lamp that the high frequency fluorescent lamp driver is designed for. In the embodiment shown in FIG. 3, impedance 22 carries a DC-current and can be implemented as an ohmic resistor.

Figure 5:
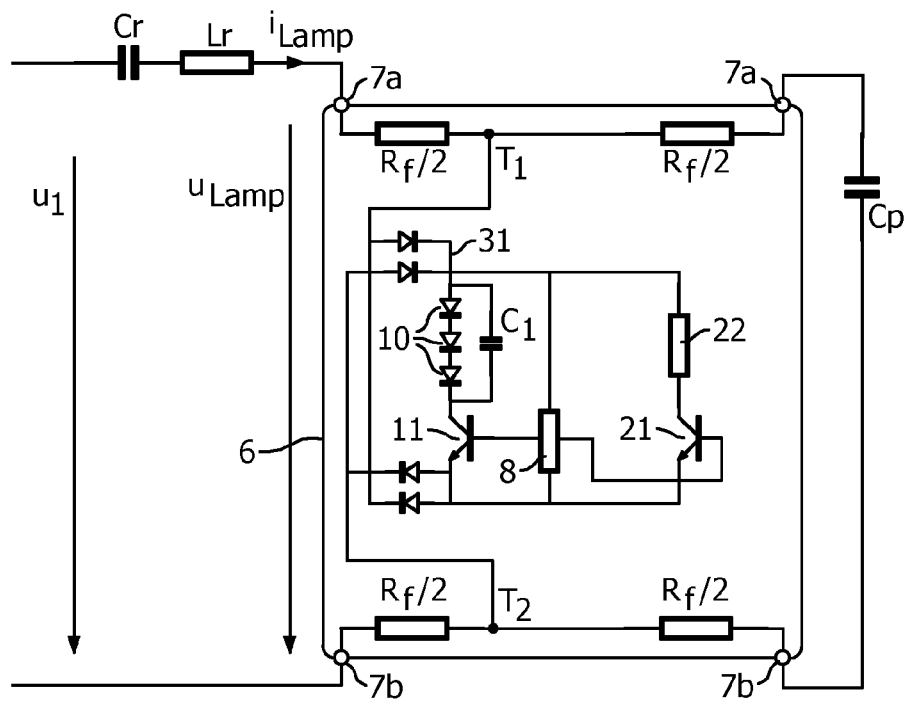

The embodiment shown in FIG. 5 differs from that shown in FIG. 4 in that the rectifier 41 is dispensed with and the series arrangement of impedance 22 and further switching element 21 forms a fifth string that interconnects the output terminals of the rectifier 31. The control electrode of the further switching element 21 is connected to an output terminal of sensor circuit 8. The operation of the embodiment shown in FIG. 5 is very similar to that shown in FIG. 4. When sensor circuit 8 senses a voltage amplitude higher than the predetermined value, it renders the first switch 11 and the further switch 21 conductive. LED-array 10, impedance 22 and both switching elements 11 and 21 carry current. Impedance 22 is dimensioned such that the sum of the currents through the third and the fifth string match the lamp current of the fluorescent lamp that the high frequency fluorescent lamp driver is designed for. Also in the embodiment shown in FIG. 5, impedance 22 carries a DC-current and can thus be implemented as a resistor.

Figure 6:
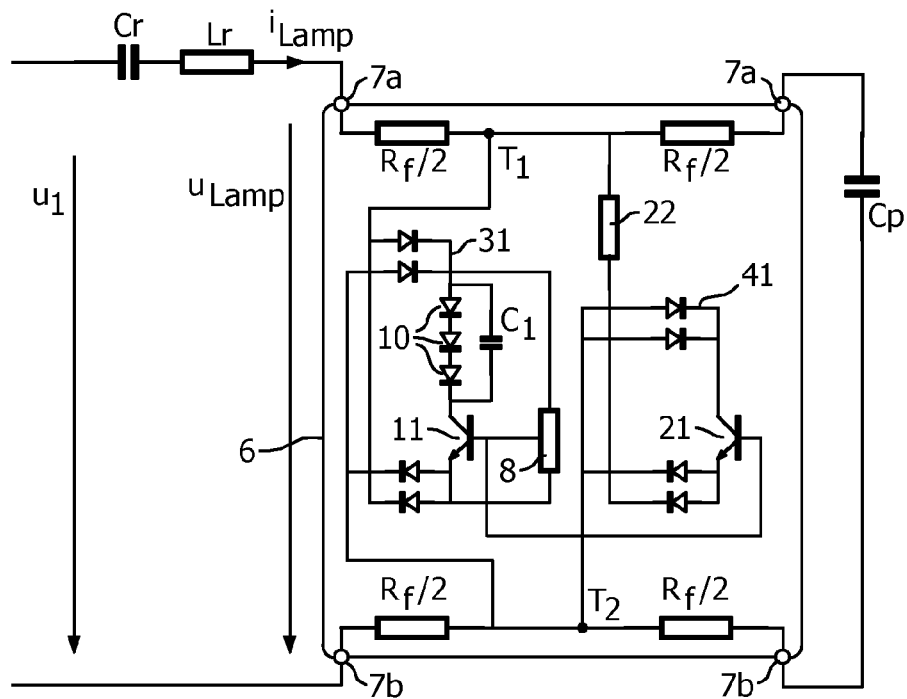

The embodiment shown in FIG. 6 differs from that shown in FIG. 4 in that the impedance 22 is connected between first terminal T1 and the rectifier 41. The output terminals of the rectifier are connected by means of the further switching element 21. The operation of the embodiment shown in FIG. 6 is very similar to that shown in FIG. 4 and that shown in FIG. 5. The only important difference is that impedance 22 carries an AC-current instead of a DC-current during operation. To minimize power dissipation, the impedance 22 is preferably implemented as a capacitor.

The invention claimed is:

1. An interface circuit for operating a light source, equipped with
   input terminals for connection to lamp connection terminals of an electronic fluorescent lamp driver,
   a first string, conductively interconnecting a first pair of input terminals,
   a second string, conductively interconnecting a second pair of input terminals,
   a third string, conductively interconnecting a first terminal of the first string and a second terminal of the second string, wherein
   the third string comprises a rectifier, output terminals of said rectifier being coupled, during operation, to the light source, and a first switching element for controlling the conductive state of the third string, such that the third string delivers a driving current to the light source when the first switching element is conductive, a fourth string coupled to the third string and comprising a sensor circuit, having an output terminal coupled to a control electrode of the first switching element, for sensing the amplitude of a high frequency AC voltage between the first and the second terminal and for rendering the first switching element conductive when the amplitude of the high frequency AC voltage reaches a predetermined value.

2. The interface circuit as claimed in claim 1, wherein the light source is a high pressure discharge lamp.

3. The interface circuit as claimed in claim 1, wherein the light source is a LED-array.

4. The interface circuit as claimed in claim 1, wherein the light source comprises an OLED.

5. The interface circuit as claimed in claim 1, wherein the interface circuit comprises a DC-DC-converter coupled, during operation, between output terminals of the rectifier and the light source.

6. The interface circuit as claimed in claim 1, wherein the interface circuit comprises a capacitor that, during operation, shunts the light source.

7. The interface circuit as claimed in claim 6, wherein the interface circuit is equipped with a fifth string connected in parallel to the third string and comprising an impedance and a further switching element having its control electrode coupled to an output terminal of the sensor circuit.

8. The interface circuit as claimed in claim 6, wherein the interface circuit is equipped with a fifth string coupled between output terminals of the rectifier comprised in the third string and comprising an impedance and a further switching element, wherein a control electrode of the further switching element is coupled to an output terminal of the sensor circuit.

9. The interface circuit as claimed in claim 6, wherein the interface circuit is equipped with a fifth string coupled between input terminals of the rectifier comprised in the third string and comprising an impedance.

10. The interface circuit as claimed in claim 8, wherein the impedance is a resistor.

11. The interface circuit as claimed in claim 8, wherein the impedance is a capacitor.

12. A method of operating a light source, making use of an electronic fluorescent lamp driver, comprising the steps of
providing a first string coupled between a first pair of lamp connection terminals of the electronic fluorescent lamp driver,
providing a second string coupled between a second pair of lamp connection terminals of the fluorescent lamp driver,
providing a rectifier,
providing a third string coupled between a first terminal of the first string and a second terminal of the second string, Including,
coupling the output terminals of said rectifier in the third string, during operation, to the light source, and a first switching element controlling the conductive state of the third string, such that the third string delivers a driving current to the light source when the first switching element is conductive,
providing a fourth string coupled to the third string for sensing a high frequency AC voltage between the first and the second string and rendering the first switching element conductive when the amplitude of the high frequency AC voltage reaches a predetermined value.

13. The method according to claim 12, further comprising the steps of
providing a fifth string connected in parallel to the third string and comprising an impedance and a further switching element having its control electrode coupled to an output terminal of the sensor circuit, and
rendering the further switching element conductive when the sensed amplitude of the high frequency AC voltage reaches the predetermined value.

14. The method according to claim 12, wherein the light source is one of the group formed by LED, OLED and high pressure discharge lamp.

15. An interface circuit for operating a light source, equipped with
input terminals for connection to lamp connection terminals of an electronic fluorescent lamp driver,
a first string, conductively interconnecting a first pair of input terminals,
a second string, conductively interconnecting a second pair of input terminals,
a third string, conductively interconnecting a first terminal of the first string and a second terminal of the second string, wherein the third string comprises a rectifier, output terminals of said rectifier being coupled, during operation, to the light source, and a first switching element for controlling the conductive state of the third string,
a fourth string coupled to the third string and comprising a sensor circuit, having an output terminal coupled to a control electrode of the first switching element, for sensing the amplitude of a high frequency AC voltage between the first and the second terminal and for rendering the first switching element conductive when the amplitude of the high frequency AC voltage reaches a predetermined value,
a capacitor that, during operation, shunts the light source, and
a fifth string connected in parallel to the third string and comprising an impedance and a further switching element having its control electrode coupled to an output terminal of the sensor circuit.

* * * * *